(12) United States Patent
Matsumoto et al.

(10) Patent No.: US 7,396,793 B2
(45) Date of Patent: Jul. 8, 2008

(54) EXHAUST GAS PURIFYING CATALYST AND PROCESS FOR PURIFYING EXHAUST GAS

(75) Inventors: Takeshi Matsumoto, Utsunomiya (JP); Takao Kobayashi, Yokohama (JP); Takuji Nakane, Himeji (JP); Takahiro Uno, Paducah, KY (US); Makoto Horiuchi, Himeji (JP)

(73) Assignees: ICT Co., Ltd., Osaka (JP); International Catalyst Technology Inc., Auburn Hills, MI (US)

( * ) Notice: Subject to any disclaimer, the term of this patent is extended or adjusted under 35 U.S.C. 154(b) by 223 days.

(21) Appl. No.: 10/535,511

(22) PCT Filed: Nov. 18, 2003

(86) PCT No.: PCT/JP03/14649

§ 371 (c)(1), (2), (4) Date: May 18, 2005

(87) PCT Pub. No.: WO2004/045765

PCT Pub. Date: Jun. 3, 2004

(65) Prior Publication Data

US 2006/0073960 A1    Apr. 6, 2006

(30) Foreign Application Priority Data

Nov. 18, 2002  (JP) .......................... 2002-333628

(51) Int. Cl.
*B01J 29/06* (2006.01)
*B01J 29/064* (2006.01)
*C01B 21/00* (2006.01)

(52) U.S. Cl. .................. 502/64; 502/60; 423/213.2; 423/239.2

(58) Field of Classification Search ............... 502/60, 502/64; 423/213.2, 239.2
See application file for complete search history.

(56) References Cited

U.S. PATENT DOCUMENTS

| 5,173,278 | A | * | 12/1992 | Marler et al. | 423/239.2 |
| 5,698,728 | A | * | 12/1997 | Schaap et al. | 556/448 |
| 5,792,436 | A | * | 8/1998 | Feeley et al. | 423/210 |
| 6,471,924 | B1 | * | 10/2002 | Feeley et al. | 423/213.5 |
| 6,489,259 | B2 | * | 12/2002 | LaBarge et al. | 502/64 |
| 2002/0086793 | A1 | * | 7/2002 | Labarge et al. | 502/67 |

FOREIGN PATENT DOCUMENTS

| EP | 0 415 410 | 3/1991 |
| JP | 60-125250 | 7/1985 |
| JP | 05-220403 | 8/1993 |
| JP | 07-289910 | 11/1995 |
| JP | 08-215542 | 8/1996 |

* cited by examiner

*Primary Examiner*—Elizabeth D Wood
(74) *Attorney, Agent, or Firm*—Occhiuti Rohlicek & Tsao LLP

(57) ABSTRACT

An exhaust gas purifying catalyst contains copper oxide, ZSM-5 and/or zeolite β, and an oxide of magnesium and/or calcium is further added thereto. A process for purifying an exhaust gas using such a catalyst is also included. By using the catalyst, NOx in an exhaust gas containing much oxygen such as exhaust gas of diesel engines can be efficiently removed and oxidation of $SO_2$ under high-temperature conditions can be suppressed.

12 Claims, No Drawings

US 7,396,793 B2

EXHAUST GAS PURIFYING CATALYST AND PROCESS FOR PURIFYING EXHAUST GAS

CROSS-REFERENCE TO RELATED APPLICATIONS

This application is the National Stage of International Application No. PCT/JP2003/014649, filed Nov. 18, 2003, which claims the benefit of Japanese Patent Application Ser. No. 2002-333628, filed on Nov. 18, 2002. The contents of both applications are hereby incorporated by reference in their entireties.

TECHNICAL FIELD

This invention relates to a catalyst for purifying exhaust gases and a process for purifying the exhaust gases using the same. More particularly, this invention relates to a catalyst for purifying exhaust gases, which is capable of reducing NOx (nitrogen oxides) therein and of suppressing the oxidation of sulfur dioxide ($SO_2$) therein, and a process for effecting the purification using the same.

BACKGROUND ART

Catalysts produced by depositing a precious metal component, such as Pt, Pd, and Rh, on an activated alumina are generally used for purifying exhaust gases from internal combustion engines. The catalyst can purify hydrocarbons (HC), carbon monoxide (CO), and NOx simultaneously, and is called as "Three Way Catalyst or TWC".

The TWC is operated effectively under the conditions nearby the theoretical air-fuel ratio (A/F), but has a problem that removal of NOx is insufficient in oxygen rich conditions for example lean condition such as exhaust gases from diesel engines.

Further, the exhaust gas of a diesel engine includes particle matters formed of carbon, a soluble organic fraction (SOF), and sulfates in a large amount, which particles harm human bodies. It, therefore, constitutes one object of the legal control. When the ordinary TWC is used for treating the exhaust gas of a diesel engine, the catalyst used is required to reduce the particle matters therein.

It is well known a copper zeolite catalyst (Cu-ZSM5), in which copper is deposited on a porous zeolite, as the catalyst for purifying NOx under lean conditions (JP-A-60-125250). When the catalyst is used for treating exhaust gases in particular from diesel engines, there are problems that particle matters cannot be reduced, since it causes $SO_2$ to oxidize and form sulfates under high temperatures of above 450° C.

DISCLOSURE OF INVENTION

In view of the above problems, this invention has been attained. An object of the present invention is to provide a catalyst for purifying exhaust gases which is capable of efficiently removing NOx from the exhaust gas having a high oxygen content, and which is capable of suppressing the oxidation of $SO_2$ under high temperatures, such as the exhaust gas of a diesel engine, and a process for the purification of the exhaust gas using the catalyst.

We made a diligent study on exhaust gas purifying catalysts with a view to accomplishing the object. We have consequently found that a catalyst for purifying exhaust gases containing copper oxide, ZSM-5 and/or zeolite β and further containing the oxide of at least one element selected from the group consisting of magnesium and calcium, is excellent. This invention has been perfected as a result. Further, we have also found that NOx can be efficiently removed and the oxidation of $SO_2$ can be suppressed by exposing the above catalyst to the exhaust gas having the volume ratio of HC and NOx (HC calculated as $C_1$: NOx) in the range of 1-20:1.

The present invention relates a catalyst for purifying exhaust gases comprising copper (existing mainly an oxide as the catalyst), ZSM5 and/or β-type zeolite, and an oxide of at least one element selected from the group consisting of magnesium and calcium.

Further, the present invention relates to a process for purifying exhaust gases by contacting the exhaust gas of HC/NOx ratio in the range of 1-20:1 (volume) with the above catalyst.

BEST MODE FOR CARRYING OUT THE INVENTION

The catalyst of this invention contains copper oxide and ZSM-5 and/or zeolite β, and further contains the oxide of at least one element selected from the group consisting of magnesium and calcium. The ZSM-5 and/or the zeolite β may be in the form of ZSM-5 zeolite alone, zeolite β alone, and the mixture of ZSM-5 zeolite and zeolite β. The mixing ratio of ZSM-5 zeolite and zeolite β is preferable in the range of 1:1-10:1 (weight).

The silica/alumina ratio by mol in the ZSM-5 zeolite is preferable in the range of 10-200 and more preferably in the range of 20-90.

The silica/alumina ratio by mol in the zeolite p is preferable in the range of 10-200 and more preferably in the range of 20-90.

The catalyst of this invention contains the oxide of magnesium and/or calcium. Among them, magnesium oxide proves particularly favorable, since the catalyst containing magnesium oxide can suppress the oxidation-of $SO_2$ without lowering the purification ability of NOx in purifying the exhaust gas from diesel engines which use fuels including sulfur. By the oxidation of $SO_2$, lots of sulfates are formed and particle matters are increased. By suppressing the oxidation thereof, the amount of exhausted particle matters can be reduced.

The amount of the oxide of magnesium and/or calcium to be added is preferable in the range of 0.1 to 1 part by weight based on 1 part by weight of the copper oxide. If the amount is less than 0.1 parts by weight, it will not suppress the oxidation of $SO_2$ fully. On the other hand, if the amount exceeds 1 part by weight, it will lower the ability to purify NOx.

In the catalyst of the present invention, the ratio of the copper oxide to a refractory three dimensional structure is preferable in the range of 3-14 g, more preferably 3-10 g, per 1 liter of the structure. If the amount is less than 3 g, the amount thereof will not be sufficient so that the NOx purification activity will be reduced. On the other hand, if the amount is more than 14 g, the conversion of $SO_2$ will increase at short time, and the sulfate will be formed. In addition, the amount of the ZSM5 and/or zeolite β is preferable in the range of 50-300 g per liter of the structure.

The catalyst components of this invention are preferably deposited on a refractory three-dimensional structure. The refractory three-dimensional structure generally includes a ceramic honeycomb substrate. Particularly, the honeycomb substrates made of materials, such as cordierite, mullite, α-alumina, zirconia, titania, titanium phosphate, aluminum titanate, aluminosilicate, and magnesium silicate, prove advantageous. Among them, the honeycomb substrate made of cordierite proves particularly preferable. Besides these substrates, the integral structure made of an antioxidant heat resisting metal, such as stainless steel or a Fe—Cr—Al alloy, may be used.

Now, the process for producing the catalyst will be described below.

The catalyst of this invention contains copper oxide and ZSM-5 and/or zeolite β. The copper oxide is preferably deposited on the ZSM-5 and/or zeolite β by a known process such as immersion and impregnation. The impregnation process will be described below. A soluble copper salt, such as copper acetate, copper nitrate, or copper sulfate, can be adopted. Powdered zeolite is preferable. When it is not in a powdered form, the zeolite is preferably pulverized to an average particle diameter not exceeding 150 μm, preferably falling in the range of 0.01-10 μm, prior to the use. The ZSM5 zeolite preferably has an average crystal diameter (primary particle diameter) of less than 0.5 μm (except for zero), and more preferably less than 0.1 μm (except for zero), observed under an electron microscope for the standpoint of increasing the initial purification activity of NOx.

Specifically, a mixed zeolite of ZSM-5 and β types is placed for example in an aqueous copper nitrate solution, and then thoroughly mixed. Alternatively, the copper nitrate may be mixed with either of the ZSM-5 and β types or with only part of the ZSM5 type or only part of the β type. The quantity of the aqueous solution is calculated based on the absorption capacity of the zeolite powder, in consideration of the size of the mixing vessel for thoroughly soaking the zeolite powder. The resultant mixture is dried at 100°-150° C. for 10-20 hours, and further calcined in air at 400°-800° C. for 1-3 hours, for example. The calcined is put to use at the next step either immediately or after being pulverized as occasion demands.

The copper-deposited zeolite powder and a precursor of the oxide of magnesium and/or calcium are pulverized together with a binder, such as silica, using a wet pulverizing device like a ball mill, and then deposited on a refractory three-dimensional structure. Magnesium nitrate, magnesium oxide, and magnesium acetate may be cited as examples of the magnesium source; calcium nitrate, calcium oxide, and calcium carbonate as examples of the calcium source. The deposited structure is dried, for instance, at 100°-150° C. for 10 minutes —one hour, and, when necessary, further calcined in air, for example, under the conditions of 400°-800° C. for 1-3 hours. The precursor may be simultaneously pulverized during the wet pulverization for obtaining the copper-deposited zeolite. Otherwise, the copper-deposited zeolite powder may be deposited on the structure and then impregnated with an aqueous solution of the precursor.

The catalyst thus obtained is effective in purifying an oxygen-rich exhaust gas in particular from diesel engines using a sulfur-containing fuel. Properly, the amount of sulfur so contained generally falls in the range of 0.001-0.5% by weight and preferably in the range of 0.001-0.05% by weight, based on the weight of the fuel. When the amount of a reducing agent, such as HC, is small in the exhaust gas, the exhaust gas requires addition of a source of hydrocarbon, since the $NO_x$ is not sufficiently reduced. At such a case, light oil, namely the fuel for the diesel engine may be added into the exhaust gas. As a means to add the light oil to the exhaust gas, known process, such as adding, dropping or spraying the light oil into the exhaust gas at the upstream side of the catalyst, can be adopted. In this case, it is preferable to set the molar ratio of the HC to the NOx (HC calculated as $C_1$/NOx) in the exhaust gas generally in the range of 1-20:1 and preferably in the range of 1-10:1, in order to reduce $NO_x$ thoroughly and prevent the added light oil from being emitted as an unaltered harmful component. If the ratio is less 1, the NOx purification ratio will be insufficient. On the other hand, if the ratio exceeds 20, unaltered harmful HC will be exhausted.

In addition, the conversion of $SO_2$ can be suppressed by adding the light oil into the exhaust gas pipe at the upstream side of the catalyst.

EXAMPLES

Now, this invention will be described specifically below with reference to examples. This invention is not limited to examples.

(Process for Testing Ability to Purify Exhaust Gas)

A turbulence chamber type diesel engine (4 cylinders, 3100 cc), and a light oil having a sulfur content of 0.05% by weight as the fuel are used.

First, an exhaust gas purifying catalyst is set at an exhaust gas pipe connected to the diesel engine. The exhaust gas is flowed through the catalyst for one hour under the condition that the engine is set rotating at 2200 rpm under pre-load and the temperature of the upstream side terminal part of the catalyst (hereinafter referred to as "catalyst inlet temperature") is 500° C.

After the catalyst inlet temperature has been fully stabilized at 500° C., the exhaust gas is analyzed for concentrations (mol) of NOx, HC, CO, and $SO_2$ on a continuous gas analyzer prior to the addition of the light oil. Specifically, the concentration of $NO_x$ is measured on a chemical emission analyzer (CLD), that of HC on a hydrogen flame ion chemical analyzer (FID), that of CO on a non-dispersion type infrared analyzer (NIDR), and that of $SO_2$ on a flame photometric detector (FPD). As a result, the composition of the exhaust gas was found to contain 320 ppm of NOx, 60 ppm of HC, 180 ppm of CO, and 15 ppm of $SO_2$.

Under the above conditions, the light oil, which is a reducing agent for NOx, is poured into the exhaust gas at the upstream side of the catalyst at a rate of 2 mL/min. The ratios of both purification of NOx and conversion of $SO_2$ are determined based on the contents of the components at the position before the catalyst prior to the addition of the light oil and the contents thereof at the position rear the catalyst after the addition thereof. The results obtained are shown in Table 2.

Example 1

H type ZSM5 (250 g, BET specific surface area: 450 m²/g, $SiO_2/Al_2O_3$ molar ratio: 80, and average crystal particle diameter: less than 0.05 μm) was added in an aqueous solution in which 51.6 g of copper nitrate (II) three hydrates had been dissolved, to thoroughly mix. After drying at 120° C. for 13 hours, the dried was calcined at 500° C. for one hour in an electric furnace. As a result, a powdered copper-ZSM5 in which copper oxide was deposited on the ZSM5 was obtained.

Then, 198 g of the obtained copper-ZSM5 powder were added in an aqueous solution including 37 g of magnesium nitrate six hydrates and 240 g of silica sol (available from Nissan Kagaku K.K. as "Snowtex", $SiO_2$: 20 wt %). After thoroughly mixing, the mixed was wet pulverized for 14 hours using a ball mill.

In the slurry obtained, an open flow type honeycomb substrate made of cordierite was immersed. Here, the honeycomb substrate had a shape of cylinder measuring 53 mm in diameter and 126 mm in length, and having about 400 gas flow cells, per square inch of the cross section.

Subsequently, the honeycomb substrate immersed with the slurry was blown to remove excess slurry, then dried (by blowing air to the cells of the structure), and thereafter calcined at 500° C. for one hour. As a result, an exhaust gas purifying catalyst was obtained.

The catalyst thus obtained contained 7 g of copper oxide (CuO), 95 g of the ZSM5, and 3 g of magnesium oxide, per 1 liter of the structure. The amounts of elements deposited are shown in Table 1. Using the catalyst, the conversions of NOx and $SO_2$ were measured. The test results are shown in Table 2.

Example 2

The procedure of Example 1 was repeated, except that the amount of magnesium nitrate six hydrates was changed from 37 g to 12 g.

The resultant catalyst was found to have 7.0 g of copper oxide, 95 g of the ZSM5, and 1 g of magnesium oxide, per liter of the structure.

Example 3

The procedure of Example 1 was repeated, except that the amount of magnesium nitrate six hydrates was changed from 37 g to 61 g.

The resultant catalyst was found to have 7.0 g of copper oxide, 95 g of the ZSM5, and 5 g of magnesium oxide, per liter of the structure.

Example 4

The procedure of Example 1 was repeated, except that 24 g of calcium nitrate four hydrates were used instead of 37 g of the magnesium nitrate six hydrates.

The resultant catalyst was found to have 7.0 g of copper oxide, 95 g of the ZSM5, and 3 g of magnesium calcium oxide, per liter of the structure.

Example 5

The procedure of Example 1 was repeated, except that 185 g of the ZSM5 and 72 g of $NH_4$ type β zeolite ($SiO_2/Al_2O_3$ molar ratio=25) were used instead of 250 g of the ZSM5.

The resultant catalyst was found to have 7.0 g of copper oxide, 70 g of the ZSM5, 25 g of the β zeolite, and 3 g of magnesium oxide, per liter of the structure.

Comparative Example 1

H type ZSM5 ($SiO_2/Al_2O_3$ molar ratio=80) was immersed in an aqueous copper acetate solution (pH was adjusted to 11 by adding ammonia). After thoroughly mixing, the immersed was dried at 120° C. for one night, and then calcined at 500° C. for one hour. A copper/ZSM5 powder was obtained.

Then, 150 g of the obtained powder were added in an aqueous solution including 184 g of silica sol (available from Nissan Kagaku K.K. as "Snowtex", $SiO_2$: 20 wt %), thoroughly mixed, and wet pulverized for 14 hours using a ball mill. The procedure of Example 1 was repeated to produce a catalyst. The catalyst was found to contain 7 g of copper oxide and 95 g of the ZSM5.

The amounts of the catalyst elements deposited on the structure regarding Examples 2-5 and Comparative Example 1 are shown in Table 1. The conversions of NOx and $SO_2$, which were measured like that of Example 1, are shown in Table 2.

TABLE 1

| | CuO | ZSM5 (MFI zeolite) H type $SiO_2/Sl_2O_3$ = 80 Average crystal less than 0.05 μm | BEA (β zeolite) $NH_4$ type $SiO_2/Al_2O_3$ = 25 | Mg or Ca |
|---|---|---|---|---|
| Example 1 | 7 | 95 | | Mg 3 (as oxide) |
| Example 2 | 7 | 95 | | Mg 1 (as oxide) |
| Example 3 | 7 | 95 | | Mg 5 (as oxide) |
| Example 4 | 7 | 95 | | Ca 3 (as oxide) |
| Example 5 | 7 | 70 | 25 | Mg 3 (as oxide) |
| Comparative Example 1 | 7 | 95 | | |

TABLE 2

| | NOx conversion | $SO_2$ conversion |
|---|---|---|
| Example 1 | 18 | 22 |
| Example 2 | 16 | 41 |
| Example 3 | 16 | 15 |
| Example 4 | 16 | 33 |
| Example 5 | 17 | 24 |
| Comparative Example 1 | 16 | 60 |

In Table 2, in accordance with Examples 1-5 not only NOx conversions are not lowered but also $SO_2$ conversions are suppressed in comparison with those of Cu-ZSM5 catalyst in Comparative Example 1.

INDUSTRIAL APPLICABILITY

The present catalyst can be used for purifying exhaust gases in particular from diesel engines.

The invention claimed is:

1. A catalyst for purifying exhaust gases, comprising a catalyst component containing copper oxide, a mixture of ZSM-5 zeolite and zeolite β, and an oxide of magnesium, wherein a mass ratio of ZSM-5 zeolite to zeolite β is in the range of 1:1 to 10:1.

2. A catalyst according to claim 1, wherein an amount of the oxide of magnesium is in the range of 0.1-1 part by weight based on 1 part by weight of the copper oxide.

3. A catalyst according to claim 1, wherein an amount of the copper oxide is in the range of 3-14 g, and an amount of the zeolite member is in the range of 50-300 g, based on 1 liter of a refractory three dimensional structure.

4. A process for purifying an exhaust gas, which comprises exposing an exhaust gas purifying catalyst set forth in claim 1 to the exhaust gas, wherein a molar ratio of hydrocarbon to nitrogen oxides is 1-20:1.

5. A process according to claim 4, wherein the exhaust gas is from a diesel engine.

6. A catalyst according to claim 2, wherein an amount of the copper oxide is in the range of 3-14 g, and an amount of the zeolite member is in the range of 50-300 g, based on 1 liter of a refractory three dimensional structure.

7. A process for purifying an exhaust gas, which comprises exposing an exhaust gas purifying catalyst set forth in claim 2 to the exhaust gas, wherein a molar ratio of hydrocarbon to nitrogen oxides is 1- 20:1.

8. A process for purifying an exhaust gas, which comprises exposing an exhaust gas purifying catalyst set forth in claim 3 to the exhaust gas, wherein a molar ratio of hydrocarbon to nitrogen oxides is 1-20:1.

9. A process for purifying an exhaust gas, which comprises exposing an exhaust gas purifying catalyst set forth in claim 6 to the exhaust gas, wherein a molar ratio of hydrocarbon to nitrogen oxides is 1-20:1.

10. A process according to claim 7, wherein the exhaust gas is from a diesel engine.

11. A process according to claim 8, wherein the exhaust gas is from a diesel engine.

12. A process according to claim 9, wherein the exhaust gas is from a diesel engine.

\* \* \* \* \*